United States Patent
Stawiszynski et al.

(10) Patent No.: US 11,528,589 B2
(45) Date of Patent: Dec. 13, 2022

(54) DEVICE, SYSTEM AND METHOD FOR MODIFYING ACTIONS ASSOCIATED WITH AN EMERGENCY CALL

(71) Applicant: MOTOROLA SOLUTIONS, INC., Chicago, IL (US)

(72) Inventors: Maciej Stawiszynski, Cracow (PL); Pawel Jurzak, Cracow (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 17/284,541

(22) PCT Filed: Oct. 26, 2018

(86) PCT No.: PCT/PL2018/050054
§ 371 (c)(1),
(2) Date: Apr. 12, 2021

(87) PCT Pub. No.: WO2020/085924
PCT Pub. Date: Apr. 30, 2020

(65) Prior Publication Data
US 2021/0385638 A1    Dec. 9, 2021

(51) Int. Cl.
*H04W 4/90* (2018.01)
*H04W 4/38* (2018.01)

(52) U.S. Cl.
CPC ............ *H04W 4/90* (2018.02); *H04W 4/38* (2018.02)

(58) Field of Classification Search
CPC .......... H04W 4/90; H04W 4/38; H04W 4/22; H04W 40/00; H04M 11/04
USPC ......................................... 348/37; 455/404.1
See application file for complete search history.

(56) References Cited

U.S. PATENT DOCUMENTS

| | | | |
|---|---|---|---|
| 9,154,562 B2 | 10/2015 | Schulzrinne et al. | |
| 2002/0051522 A1* | 5/2002 | Merrow | H04M 3/46 379/88.01 |
| 2003/0012344 A1* | 1/2003 | Agarwal | H04M 11/045 379/37 |

(Continued)

FOREIGN PATENT DOCUMENTS

EP    2575128 A2    4/2013

OTHER PUBLICATIONS

"International Search Report", dated May 6, 2019, issued in corresponding PCT application No. PCT/PL2018/050054, Oct. 26, 2018.

*Primary Examiner* — Maria El-Zoobi
(74) *Attorney, Agent, or Firm* — Perry + Currier, Inc.

(57) ABSTRACT

A device, system and method for modifying actions associated with an emergency call is provided. A mobile device operates a virtual assistant application, which connects to an emergency call that includes a dispatcher and a caller communicating on the emergency call. The mobile device monitors, using the virtual assistant application, the emergency call to determine context information of the emergency call. The mobile device receives, at the virtual assistant application, sensor data from sensors associated with the mobile device. The mobile device correlates, using the virtual assistant application, the context information with the sensor data. The mobile device causes, using the virtual assistant application, a modification of an action associated with the emergency call based on a correlation between the context information with the sensor data.

20 Claims, 4 Drawing Sheets

(56) References Cited

U.S. PATENT DOCUMENTS

| | | |
|---|---|---|
| 2007/0121829 A1 | 5/2007 | Tal et al. |
| 2008/0299940 A1 | 12/2008 | Shaffer et al. |
| 2014/0194082 A1* | 7/2014 | Wingert ............ H04M 3/42221 |
| | | 455/404.1 |
| 2015/0245189 A1 | 8/2015 | Nalluri et al. |
| 2016/0100302 A1 | 4/2016 | Barash et al. |
| 2016/0373578 A1 | 12/2016 | Klaban |
| 2017/0289350 A1* | 10/2017 | Philbin ................ G08B 25/016 |
| 2021/0074288 A1 | 3/2021 | Stefanski et al. |

\* cited by examiner

DEVICE, SYSTEM AND METHOD FOR MODIFYING ACTIONS ASSOCIATED WITH AN EMERGENCY CALL

BACKGROUND OF THE INVENTION

Dispatchers at computer-aided dispatch centers, and/or emergency call centers, generally initially speak with callers in emergency calls. The dispatchers may then decide, based on a conversation with a caller, first responders to dispatch in response to the emergency call. However, such a process can be time consuming, and a response to the emergency call may be delayed, depending on how quickly the dispatcher can determine which first responders to dispatch. The process can be further slowed down by a volume of emergency calls that a dispatcher may be managing.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a method comprising: operating, using a controller of a mobile device, a virtual assistant application; connecting, using the controller and a communication unit of the mobile device, the virtual assistant application to an emergency call that includes a dispatcher and a caller communicating on the emergency call; monitoring, using the virtual assistant application, the emergency call to determine context information of the emergency call; receiving, at the virtual assistant application, sensor data from sensors associated with the mobile device; correlating, using the virtual assistant application, the context information with the sensor data; and causing, using the virtual assistant application, a modification of an action associated with the emergency call based on a correlation between the context information with the sensor data.

Another aspect of the specification provides a mobile device comprising: a communication unit; and a controller communicatively coupled to the communication unit, the controller configured to: operate a virtual assistant application; connect, using the communication unit, the virtual assistant application to an emergency call that includes a dispatcher and a caller communicating on the emergency call; monitor, using the virtual assistant application, the emergency call to determine context information of the emergency call; receive, at the virtual assistant application, sensor data from sensors associated with the mobile device; correlate, using the virtual assistant application, the context information with the sensor data; and cause, using the virtual assistant application, a modification of an action associated with the emergency call based on a correlation between the context information with the sensor data.

Figure 1:
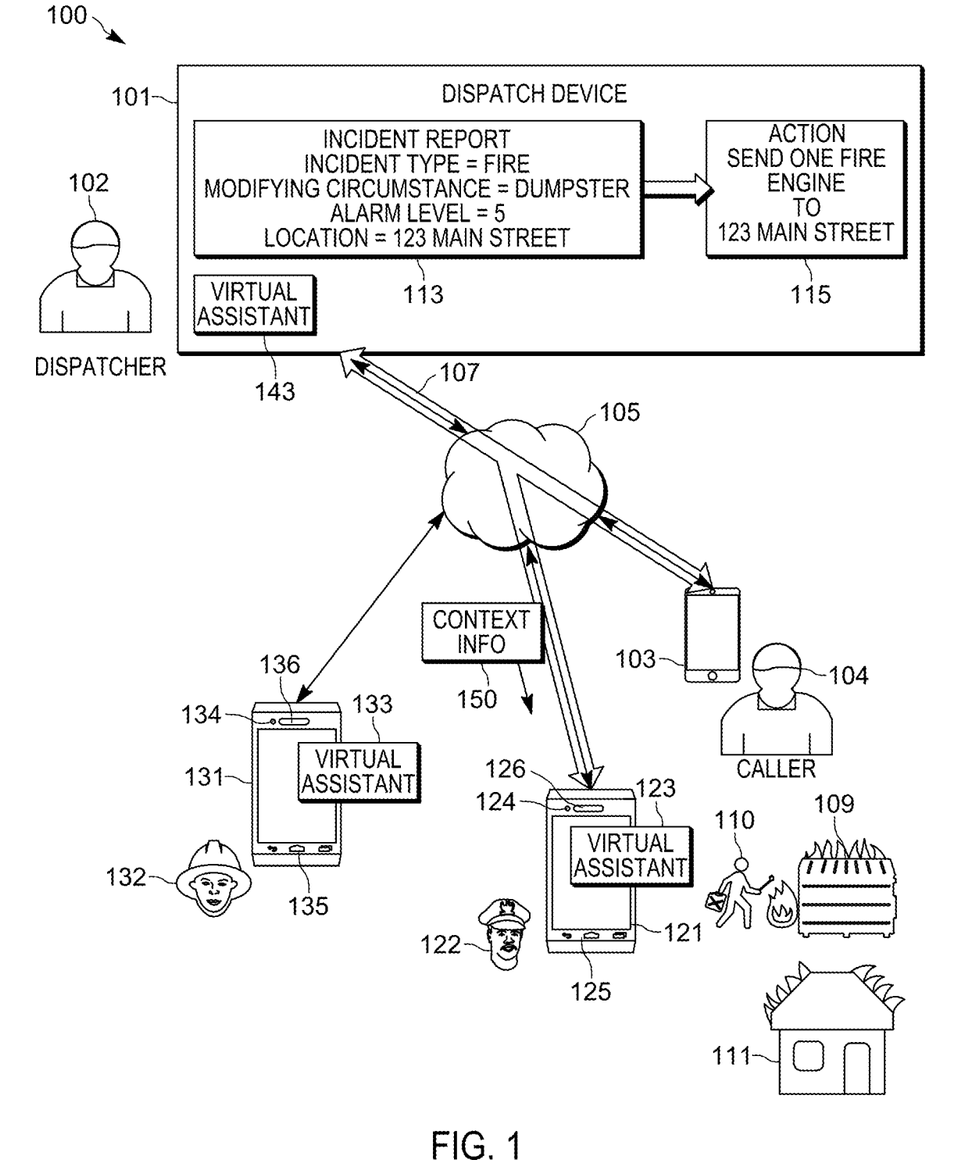
FIG. 1 is a system for modifying actions associated with an emergency call, in accordance with some examples.

Attention is directed to FIG. 1, which depicts an example system 100 for modifying actions associated with an emergency call. The system 100 comprises a dispatch device 101, operated by a dispatcher 102, in communication with a calling device 103, operated by a caller 104, via at least one communication network 105 (interchangeably referred to hereafter as the network 105). The network 105 may include, but is not limited to, the Internet, a cell phone network, and a public safety communication network, and the like. For example, each of the devices 10, 103 may be in communication with the network 105 via respective wired or wireless communication links, as desired, depicted in FIG. 1 as double-ended arrows between the network 105 and respective components of the system 100. In FIG. 1, the caller 104 has operated the calling device 103 to make an emergency call 107 (e.g. a cell phone call and/or a telephone call) to the dispatcher 102, who operates the dispatch device 101 to communicate with the caller 104 on the emergency call 107. As depicted, the emergency call 107 is via the network 105 and the various communication links between the devices 101, 103 and the network 105.

In an example, as depicted, the caller 104 may be calling the dispatcher 102 to report a dumpster 109 on fire. The caller 104 may further report a description of a suspect 110 who may have been seen starting the fire. Unbeknownst to the caller 104, however, a building 111 near the dumpster 109 is also on fire. As the dispatcher 102 has been made aware only of the dumpster 109 on fire, the dispatcher 102 operates the dispatch device 101 to generate an incident report 113 that includes data indicating that an incident type associated with the emergency call 107 is a "FIRE" with a modifying circumstance of the fire being at a "DUMPSTER" which sets an alarm level to "5". The incident report 113 further includes an address (e.g. "123 Main Street") associated with the emergency call 107 which may be determined via the dispatcher 102 talking with the caller 104 and populated at incident report 113 by the dispatcher 102 and/or the address may be automatically determined via Automatic number identification (ANI), and automatic location identifier (ALI), and the like used in emergency call systems. Hence, an action 115 is generated based on the incident report which causes one fire engine to be dispatched to the address in the incident report 113; the action 115 may comprise an automatic dispatch command transmitted, for example, to a fire station closest to the address, and may be generated using preconfigured rules at the dispatch device 101. As the incident report 113 is incorrect and the building

111 is also on fire, the one fire engine dispatched may not be sufficient to respond to the fires at both the dumpster 109 and the building 111.

However, the dispatch device 101 is generally further configured to determine a mobile device associated with a first responder that is near the address and connect a virtual assistant application of the mobile device to the emergency call 107, for example using a three-way calling command and/or a group calling command and/or a conference call command, and the like.

For example, as depicted, the system 100 further comprises a mobile device 121, associated with (and/or carried by) a first responder 122 (as depicted a patrol officer and/or a police officer), the mobile device 121 further operating a virtual assistant application 123. The mobile device 121 further comprises one or more sensors, for example a camera 124 and a microphone 125 which may be used by the mobile device 121 to gather data regarding the incident associated with the emergency call 107. As depicted, the mobile device 121 further comprises a speaker 126; the microphone 125 and the speaker 126 (and optionally the camera 124) may enable the first responder 122 to use the mobile device 121 to participate in calls, such as the emergency call 107.

As depicted, the system further comprises a second mobile device 131, associated with (and/or carried by) another first responder 132 (as depicted a fire fighter), the mobile device 131 further operating a respective virtual assistant application 133. The mobile device 131 further comprises one or more sensors, for example a camera 134 and a microphone 135 which may be used by the mobile device 131 to gather data regarding the incident associated with the emergency call 107. As depicted, the mobile device 131 further comprises a speaker 136; the microphone 135 and the speaker 136 (and optionally the camera 134) may enable the first responder 132 to use the mobile device 131 to participate in calls, such as the emergency call 107.

While two mobile devices 121, 131 are depicted in FIG. 1, the system 100 may comprise as few as one mobile device and as many as tens, hundreds, or more mobile devices, each, for example associated with, and/or carried by and/or operated by a respective first responder, and the dispatch device 101 may have access to a database of the mobile devices. Furthermore, while as depicted, the mobile devices 121, 131 are depicted as mobile communication devices (e.g. having a cell phone format, and the like), the mobile devices 121, 131 may be in any suitable format, such as remote speaker microphones, body worn cameras, smart glasses, and the like.

Furthermore, each of the mobile devices 121, 131 may periodically report their respective locations to the dispatch device 101 and/or a database to which the dispatch device 101 has access, and the like. Alternatively, a respective location of each of the mobile devices 121, 131 may be determined using triangulation techniques using components of the network 105. Hence, the dispatch device 101 may be generally configured to determine a respective location of each of the mobile devices 121, 131. Indeed, the dispatch device 101 may further have access to other types of information associated with the mobile devices 121, 131 including, but not limited to, which of the mobile devices 121, 131 operates a respective virtual assistant application 123, 133 (e.g. other mobile devices in the system 100 may not operate virtual assistant applications), a role and/or title and/or capabilities of each of the responders 122, 132, and the like.

Furthermore, while present examples are described with respect to the first responders 122, 132 respectively being a police officer and a firefighter, each of the first responders 122, 132 may be any type of first responders including, but not limited to, emergency medical technicians (EMTs), and the like.

As depicted, the dispatch device 101 also operates a virtual assistant application 143. Each of the virtual assistant applications 123, 133, 143 are separate from standard call applications and/or talk group applications that may reside at the dispatch device 101 and/or the mobile devices 121, 131; such call applications and/or talk group applications generally enable a user (such as the dispatcher 102 and/or the responders 122, 132) to accept/make standard calls, including, but not limited to, the emergency call 107, and/or any telephone calls, cellphone calls, talkgroup calls (and/or push-to-talk (PTT) calls). In particular, and as will be explained hereafter, the virtual assistant applications 123, 133, 143 may be used to initially connect a mobile device 121, 131 to the emergency call 107, but may not (at least initially) reproduce audio received on the emergency call 107 via a speaker 126, 136 or process microphone audio (e.g. received at a microphone 125, 135) for reproduction in the emergency call 107. In contrast, when a call (such as the emergency call 107) is connected to a mobile device 121, 131 via a respective call application, a mobile device 121, 131 is connected to the call in which audio received via a microphone 125, 135 is reproduced on the call and audio received on the call is reproduced at a speaker 126, 136.

Furthermore, as will be explained hereafter, while each of the virtual assistant applications 123, 133, 143 in FIG. 1 are depicted as stand-alone applications at each of the mobile devices 121, 131 and the dispatch device 101, the virtual assistant applications 123, 133, 143 are generally implemented by respective controllers, and the like, each of the mobile devices 121, 131 and the dispatch device 101.

In general, the virtual assistant application 143 at the dispatch device 101 is configured to monitor the emergency call 107 and determine a mobile device 121, 131 that includes a respective virtual assistant applications 123, 133 to include on the emergency call 107. For example, the virtual assistant application 143 may monitor the emergency call 107 and/or associated information, such as the address, and determine which of the virtual assistant applications 123, 133 of the mobile devices 121, 131 to include on the emergency call 107. In some examples, such a decision may be based on the location of the mobile devices 121, 131 and/or a role of associated responders 122, 132. For example, as depicted, the virtual assistant application 143 may have determined that while the mobile device 131 is operated by the first responder 132, whose capabilities may be more relevant to the incident associated with the emergency call 107, the mobile device 121 is closer in distance to the incident associated with the emergency call 107; as such, as depicted, the virtual assistant application 143 has connected the virtual assistant application 123 of the mobile device 121 to the emergency call 107.

The virtual assistant application 123 may monitor the emergency call 107 to determine context information of the emergency call 107, including, but not limited to, context information 150 received in association with the emergency call 107, and correlate such context information with sensor data received from sensors of the mobile device 121 to cause a modification of an action associated with the emergency call 107 including, but not limited to the action 115) based on a correlation between the context information with the sensor data. For example, virtual assistant application 123 can determine whether there is a match and/or association between what is said on the emergency call 107 and what is "observed" via sensor data from sensors associated with the mobile device 121, for instance by recognizing keywords spoken in the emergency call 107 (such as "fire", "dumpster", a description of a suspect, and the like) and further recognizing associated items in the sensor data.

Figure 2:
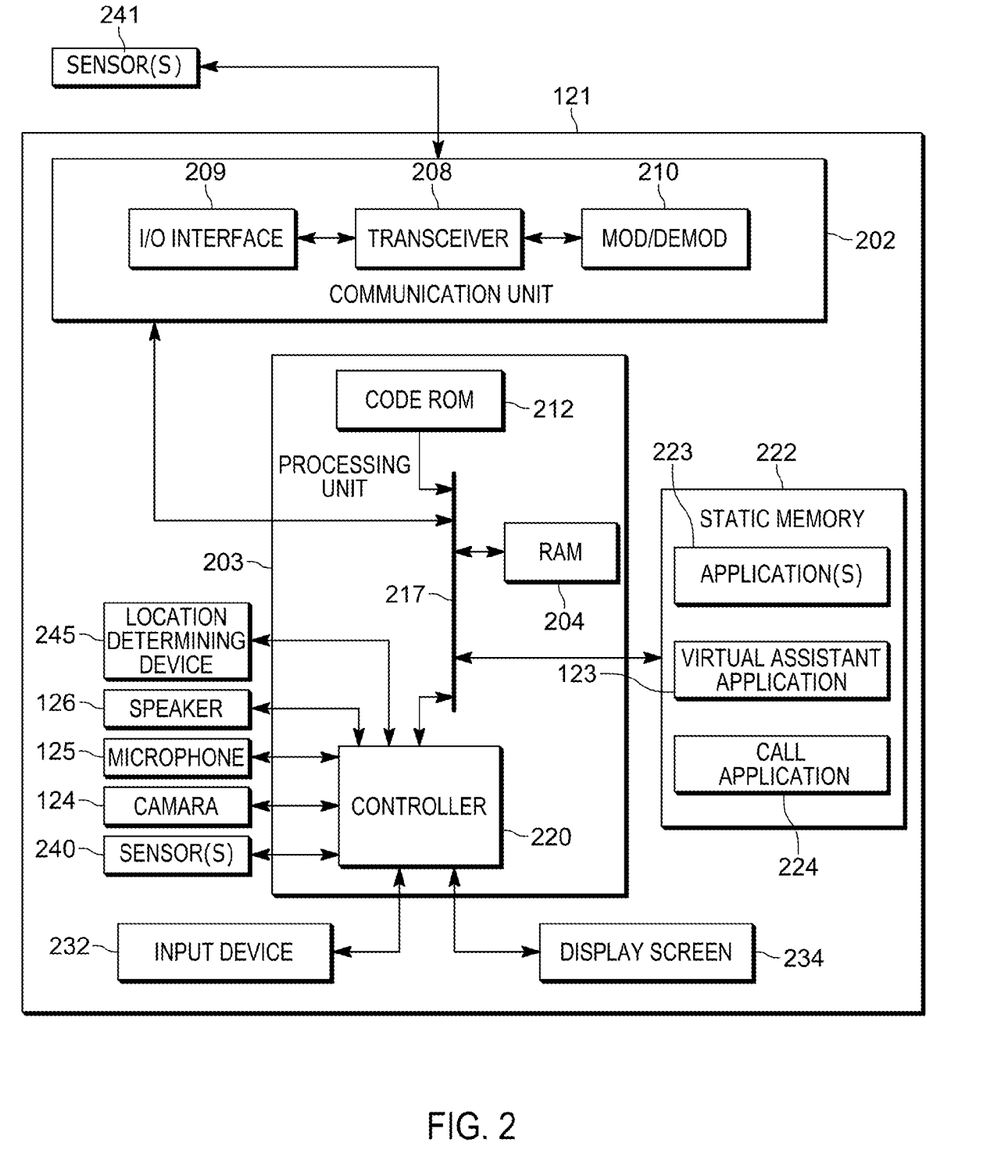
FIG. 2 is a device diagram showing a device structure of a mobile device for modifying actions associated with an emergency call, in accordance with some examples.

Attention is next directed to FIG. 2 which depicts a schematic block diagram of an example of the mobile device 121. In general, the mobile device 121 may comprise: a communications unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 (storing at least one application 223, the virtual assistant application 123 and a call application) an input device 232, a display screen 234, the camera 124, the microphone 125 and the speaker 126.

Hereafter, the at least one application 223 will be interchangeably referred to as the application 223.

Furthermore, as described above, the virtual assistant application 123 is different from the call application 224. In particular, the call application 224 may comprise a telephone call application, a cellphone call application a talkgroup application, a PTT application, and the like which, when implemented at the mobile device 121 enables the responder 122 to communicate on calls using the microphone 125 and the speaker 126, and optionally the camera 124. In contrast, the virtual assistant application 123 may be used to initially connect the mobile device 121 to a call, such as the emergency call 107, but may not (at least initially) reproduce received audio via the speaker 126 or process microphone audio (e.g. received at the microphone 125). Rather, the virtual assistant application 123 may be connected to the emergency call 107 to monitor the emergency call 107, and the like, without the responder 122 being alerted that the mobile device 121 is engaging in the emergency call 107, and with the microphone 125 and speaker 126 not being initially used by the virtual assistant application 123 in the emergency call 107.

As depicted, the mobile device 121 may further comprise one or more other types of sensors 240, and/or be the mobile device 121 may be in communication with one or more external sensors 241 via the communication unit 202; such sensors 240, 241 may include a gas sensor, a body-worn camera, a holster sensor, a motion sensor, an accelerometer, a gyroscope, a magnetometer and the like. Sensors 241 may include sensors and/or devices worn by the first responder 122 that are in communication with the mobile device, for example in a personal area network (PAN) and the like.

As shown in FIG. 2, the mobile device 121 includes the communications unit 202 communicatively coupled to the common data and address bus 217 of the processing unit 203.

The input device 232 may comprise one or more of a keypad, pointing device, touch-sensitive surface (e.g. at the display screen 234), and the like, and the display screen 234 may comprise a flat panel display, and the like, which, in some examples, may be include a touch screen and/or a touch-sensitive surface of the input device 232, and thus also act as an input device). The camera 124 may comprise one or more video cameras and/or one or more still-image cameras that captures images of in a region around the mobile device 121 (e.g. at a rear and/or front side of the mobile device 121); the camera 124 may act as a sensor that detects images for use by the virtual assistant application 123 and/or the camera 124 may be used in video calls that include the responder 122. Similarly, the microphone 125 may act as a sensor that detects audio for use by the virtual assistant application 123 and/or the microphone 125 may be used in video calls and/or audio calls that include the responder 122.

As depicted, the mobile device 121 further includes a location determining device 245 (such as a Global Positioning System (GPS) device, and the like) which may determine a location of the mobile device 121 and periodically report the location to the dispatch device 101 and/or a database to which the dispatch device 101 has access.

The camera 124, the microphone 125 and the speaker 126, the input device 232 and the display screen 234, the sensors 240 and the location determining device 245, are each in communication with the processing unit 203 and/or the controller 220. The sensors 241 are in communication with the processing unit 203 and/or the controller 220 via the communication unit 202.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communications unit 202 may include one or more wired and/or wireless input/output (I/O) interfaces 209 that are configurable to communicate with the dispatch device 101, other mobile devices (e.g. the mobile device 131), and/or the external sensors 241. For example, the communication unit 202 may include one or more transceivers 208 and/or wireless transceivers for communicating with the dispatch device 101, other mobile devices (e.g. the mobile device 131), and/or the external sensors 241. Hence, the one or more transceivers 208 may be adapted for communication with the network 105. For example, the network 105 may comprise one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (WiMAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communications unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the mobile device 121 is not a generic controller and/or a generic device, but a device specifically configured to implement functionality for modifying actions associated with an emergency call. For example, in some examples, the mobile device 121 and/or the controller 220 specifically comprises a computer executable engine configured to implement functionality for modifying actions associated with an emergency call.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the mobile device 121 as described herein are maintained, persistently, at the memory 222 and used by the controller 220 which makes appropriate utilization of volatile storage during the execution of such programming instructions.

In particular, the memory 222 stores instructions corresponding to the at least one application 223 that, when executed by the controller 220, enables the controller 220 to implement functionality for modifying actions associated with an emergency call. In illustrated examples, when the controller 220 executes the one or more applications 223, the controller 220 is enabled to: operate the virtual assistant application 123; connect, using the communication unit 202 of the mobile device 121, the virtual assistant application 123 to the emergency call 107 that includes the dispatcher 102 and the caller 104 communicating on the emergency call 107; monitor, using the virtual assistant application 123, the emergency call 107 to determine context information of the emergency call 107; receive, at the virtual assistant application 123, sensor data from sensors associated with the mobile device 121; correlate, using the virtual assistant application 123, the context information with the sensor data; and cause, using the virtual assistant application 123, a modification of an action associated with the emergency call 107 based on a correlation between the context information with the sensor data.

The correlation between the context information with the sensor data, and the modification of the action associated with the emergency call 107 may be implanted using machine learning and/or deep-learning based algorithms. Hence, the application 223 and/or the virtual assistant application 123 may include machine learning and/or deep-learning based algorithms, and the like, which have been trained and/or configured to correlate context information with sensor data, and modify actions associated with emergency calls. Indeed, such training may occur by implementing the application 223 and providing feedback to the application 223 based on past implementations of the application 223. Furthermore, the application 223 may initially be operated by the controller 220 in a training mode to train the application 223 to correlate context information with sensor data, and modify actions associated with emergency calls.

The one or more machine learning algorithms and/or deep learning algorithms of the application 223 and/or the virtual assistant application 123 may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm and/or deep learning algorithm is within the scope of present examples.

Furthermore, the application 223 and/or the virtual assistant application 123 may include video and/or image analytics algorithms (and/or audio analytics algorithms) for analyzing video and/or images from the camera 124 (and/or audio from the microphone 125).

While details of the mobile device 131 and the dispatch device 101 are not depicted, each of the mobile device 131 and the dispatch device 101 may have components similar to the mobile device 121 adapted, however, for the respective functionality of the mobile device 131 and the dispatch device 101. For example the mobile device 131 may be generally similar to the mobile device 121 but may include different sensors (e.g. for use with firefighters). Similarly, the dispatch device 101 may be similar to the mobile device 121 but maybe adapted for wireline communications (e.g. as the dispatch device 101 may be fixed) and/or may not include sensors and/or may have a physical footprint of a dispatch terminal. The calling device 103 may also be similar to the mobile device 121, but may be a commercial mobile device or a fixed device and/or wireline device, with the functionality thereof adapted accordingly; furthermore, the calling device 103 may generally not include a virtual assistant application but will generally a suitable commercial call application such that the calling device 103 may conduct and/or initiate the emergency call 107.

Figure 3:
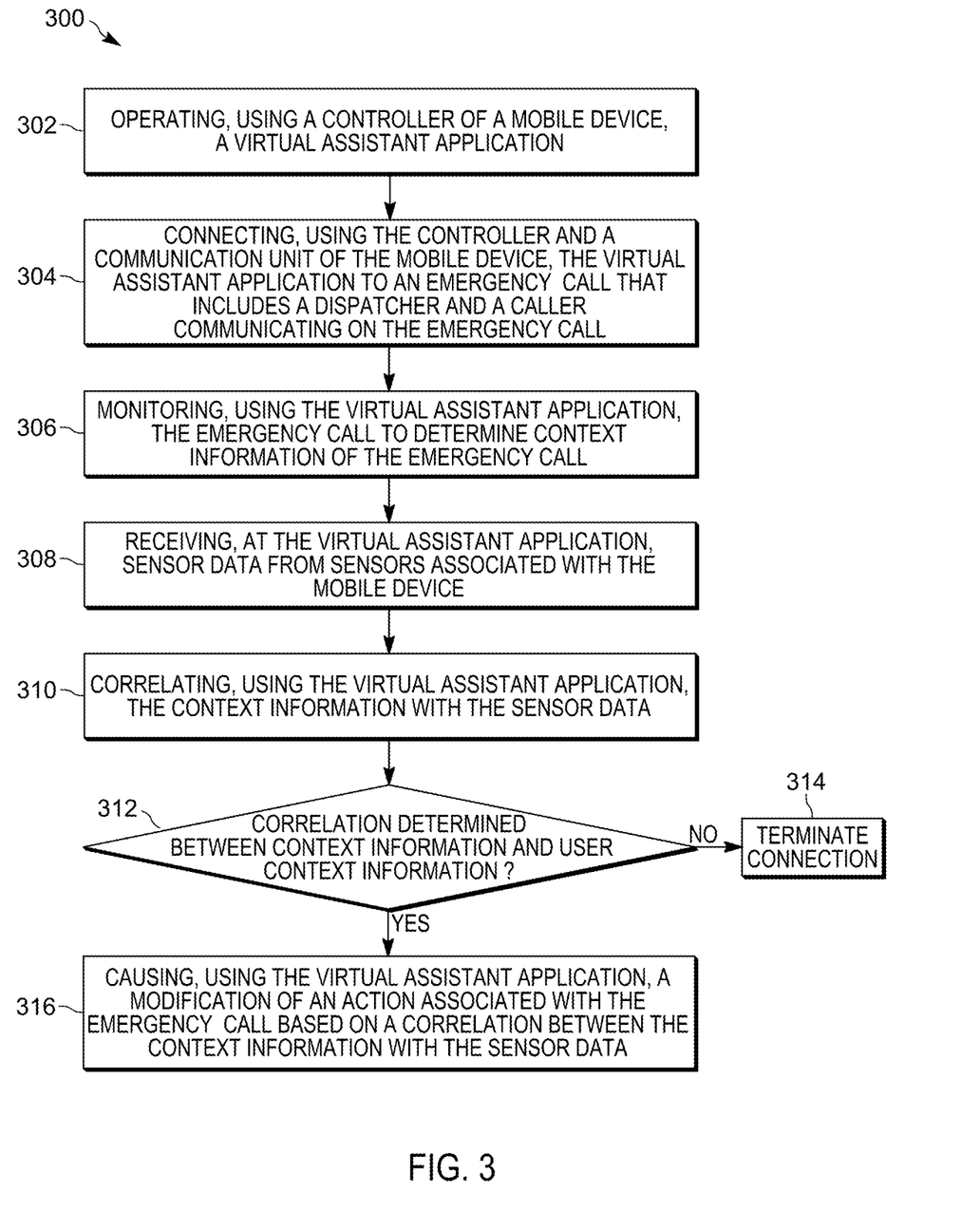
FIG. 3 is a flowchart of a method for modifying actions associated with an emergency call, in accordance with some examples.

Attention is now directed to FIG. 3 which depicts a flowchart representative of a method 300 for modifying actions associated with an emergency call. The operations of the method 300 of FIG. 3 correspond to machine readable instructions that are executed by the mobile device 121, and specifically the controller 220 of the mobile device 121. In the illustrated example, the instructions represented by the blocks of FIG. 3 are stored at the memory 222 for example, as the application 223. The method 300 of FIG. 3 is one way in which the controller 220 and/or the mobile device 121 and/or the system 100 may be configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present examples.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 operates the virtual assistant application 123. For example, the controller 220 may operate the virtual assistant application 123 upon startup of the mobile device 121 and/or when a call, such as the emergency call 107, is received at the mobile device 121

At a block 304, the controller 220 connects, using the communication unit 202 of the mobile device 121, the virtual assistant application 123 to the emergency call 107 that includes the dispatcher 102 and the caller 104 communicating on the emergency call 107. In particular, the virtual assistant application 143 at the dispatch device 101 may cause the emergency call 107 to be connected to the mobile device 121, as described above, and the controller 220 may: receive the emergency call 107; detect that the received emergency call 107 has been connected via the dispatch device 101 and/or the virtual assistant application 143 at the dispatch device 101 (e.g. via an identifier and the like, received with the emergency call 107); and connect the virtual assistant application 123 to the emergency call 107. In particular, the controller 220 may select the virtual assistant application 123 to connect to the emergency call 107 and not select the call application 224 to connect to the emergency call 107. The controller 220 may further suppress audio received at the microphone 125 on the emergency call 107.

At a block 306, the controller 220 monitors, using the virtual assistant application 123, the emergency call 107 to determine context information of the emergency call 107.

The context information may include, but is not limited to, one or more of a location associated with the emergency call 107; an incident report file associated with the emergency call 107 (e.g. the incident report 113); an incident type associated with the emergency call 107; a modifying circumstance associated with the incident type; a priority associated with the emergency call 107; user context information of a user (e.g. the first responder 122) associated with the mobile device 121; role of the user associated with the mobile device 121; capabilities of the user associated with the mobile device 121; equipment available to the user associated with the mobile device 121; and a current assignment of the user associated with the mobile device 121.

For example, the incident report 113 may be transmitted to the mobile device 121 in the context information 150 (on the emergency call 107 and/or using a data connection) received in association with the emergency call 107, for use by the virtual assistant application 123. However, the context information may include information associated with of a user (e.g. the first responder 122) associated with the mobile device 121, which may also be transmitted with the context information 150 and/or stored on the mobile device 121; for example, the memory 222 may store one or more of a role, capabilities, equipment available, and a current assignment of first responder 122.

Similarly, the address of the incident associated with the emergency call 107, for example as detected automatically by an ANI/ALI system, may be transmitted in the context information 150.

In yet further alternatives, context information of the emergency call 107 may be determined by the virtual assistant application 123 monitoring speech on the emergency call 107 to detect, for example, an address, an incident type, a modifying circumstance, a priority, and the like, for example prior to the incident report 113 being generated. Indeed, the virtual assistant application 123 may determine keywords (e.g. "fire", "dumpster", a description of the suspect 110, and the like) spoken on the emergency call 107. Hence, in these examples, machine learning algorithms of the application 223 and/or the virtual assistant application 123 are further trained to determine context information and/or keywords by monitoring speech.

At a block 308, the controller 220 receives, at the virtual assistant application 123, sensor data from sensors associated with the mobile device 121.

The sensor data may include, but is not limited to, one or more of: one or more images from one or more cameras (e.g. the camera 124 and/or a camera of a body-worn camera, and the like (e.g. an external sensor 241)); audio from one or more microphones (e.g. the microphone 125 and/or a microphone of a body-worn camera, and the like (e.g. an external sensor 241); motion sensor data from one or more motion sensors (e.g. a sensor 240, the location determining device 245, and/or an external sensor 241); gas sensor data from one or more gas sensors (e.g. a sensor 240 and/or an external sensor 241); and holster sensor data from a holster sensor (e.g. an external sensor 241); and the like.

At a block 310, the controller 220 correlates, using the virtual assistant application 123, the context information 150 with the sensor data.

In some examples, the correlating of the context information with the sensor data may comprise: matching information in the sensor data with respective keywords spoken on the emergency call 107 and/or correlating words and/or information in the context information with the sensor data. For example, the context information may indicate the fire at the dumpster 109, while the sensor data may indicate that the building 111 is also on fire and/or that the suspect 110 is fleeing the scene of the incident (e.g. as determined using video and/or image analytics algorithms, and the like). Hence, the virtual assistant application 123 may generally compare the context information with the sensor data to search for correlations therebetween that may show matching of information and/or not matching of information. For example, the context information and the sensor data may both indicate that a fire is occurring, which shows a match between correlated context information and sensor data, but the sensor data may indicate a larger fire than indicated in the correlated context information.

However, in some examples while a correlation may occur between the context information and the sensor data, there may or may not be a correlation between the context information and user context data.

Hence, at a block 312, the controller 220 determines correlations between context information of the emergency call 107 and user context information associated with a user of the mobile device 121. When no correlations were determined (e.g. a "NO" decision at the block 312) at a block 314, the virtual assistant application 123 may terminate the connection to the emergency call 107. For example, the method 300 may further include terminating, using the virtual assistant application 123, a connection to the emergency call 107 by the virtual assistant application 123 when no correlation is determined between the context information of the emergency call 107 and user context information associated with a user of the mobile device 121.

For example, no correlation may be determined between the context information of the emergency call 107 and user context information associated with a user of the mobile device 121 when the sensor data indicates that the first responder 122 is currently not available to respond to the incident associated with the emergency call 107. For example, the sensor data may indicate that the first responder 122 has drawn a gun (e.g. from holster sensor data) and is running (e.g. from motion sensor data) and hence may be involved in another incident. Hence, in these examples, user context information may be determined from sensor data.

In yet other examples, no correlation may be determined between the context information of the emergency call 107 and user context information associated with a user of the mobile device 121 when the first responder 122 has been dispatched to another incident, for example a robbery, and the like, and cannot respond to the incident associated with the emergency call 107. In some of these examples, the mobile device 121 may have previously received a dispatch command dispatching the first responder 122 to another incident, and the virtual assistant application 123 may determine that the first responder 122 has been dispatched to another incident by retrieving the dispatch command from the memory 222, and the like. In yet other examples, the virtual assistant application 123 may communicate with the dispatch device 101 and/or the virtual assistant application 143 at the dispatch device 101 to determine whether the first responder 122 has been dispatched to another incident (e.g. via the emergency call 107 and/or a data connection with the dispatch device 101).

However, at the block 312, the controller 220 may determine a correlation between the context information of the emergency call 107 and user context information when the first responder 122 has not been dispatched to another incident and/or sensor data indicates that the first responder 122 may be available to respond to the incident associated with the emergency call 107.

Hence, in these examples, machine learning algorithms of the application 223 and/or the virtual assistant application 123 are further trained to determine correlations between context information of an emergency call and user context information.

However, in some examples, the blocks 312, 314 may be optional.

When correlations were determined at the block 312 (e.g. a "YES" decision at the block 312), and/or following the block 310, at a block 316, the controller 220 causes, using the virtual assistant application 123, a modification of an action associated with the emergency call 107 based on a correlation between the context information 150 with the sensor data.

For example, in some examples, the modification of the action associated with the emergency call 107 may comprise causing a change to one or more of: a number of emergency responders dispatched in association with the emergency call 107; a type of the emergency responders dispatched in association with the emergency call 107; an incident report file associated with the emergency call 107; an incident type associated with the emergency call 107; a modifying circumstance associated with the incident type; and a priority associated with the emergency call 107.

For example, the virtual assistant application 123 may communicate with the dispatch device 101 and/or the virtual assistant application 143 at the dispatch device 101 to change and/or update information at the incident report 113 and/or the action 115. In the example depicted in FIG. 1, the incident report may be updated to change the modifying circumstances from "DUMPSTER" to "BUILDING" and the alarm level (e.g. a priority) from "5" to "3" (e.g. a higher priority). The incident report 113 may further be updated to include an incident type of "ARSON". Similarly, the action 115 may be changed to dispatch two fire engines, one ladder truck, an ambulance, and a police car to the address associated with the incident (e.g. which also changes and/or updates a type of responders dispatched to include EMTs and police officers).

However, in some of these example, the virtual assistant application 123 may request, on the emergency call 107, that the dispatcher 102 confirm the modification of the action prior to causing the modification of the action. For example, the application 223, and/or the virtual assistant application 123 may include, and/or have access to, a text-to-speech application, which enables the virtual assistant application 123 to "talk" on the emergency call 107 to tell the dispatcher 102 that modification to the action 115 is to occur, and to request the dispatcher 102 to confirm. The dispatcher 102 may provide such a confirmation verbally (e.g. the application 223, and/or the virtual assistant application 123 may include, and/or have access to, a speech-to-tect application) and/or by operating an input device. The modification of the action may not occur until such confirmation to modify the action is received.

In some of these examples, the virtual assistant application 123 may ask the dispatcher 102 and/or the caller 104 a question on the emergency call 107 (e.g. again using a text-to-speech algorithm) based on analysis of the context information prior to determining the modification of the action and/or prior to causing the modification of the action; indeed, the answers to the question may assist the virtual assistant application 123 with determining the modification of the action. For example, the virtual assistant application 123 may ask the caller 104 to confirm whether the building 111 is on fire and/or ask the caller 104 for a description of the suspect 110. Similarly, the virtual assistant application 123 may ask the dispatcher 102 whether more than one ambulance should be dispatched and/or whether any police officers should be dispatched. The virtual assistant application 123 may determine how to modify an action based on the received answers.

However, other types of actions may also be modified at the block 316. For example, the modification of the action associated with the emergency call 107 may comprise causing, using the speaker 126 and the microphone 125 of the mobile device 121, a user of the mobile device 121 (e.g. the first responder 122) to be included on the emergency call 107. In these examples, the virtual assistant application 123 may determine that the first responder 122 should be included on the emergency call 107 (e.g. when the caller 104 is providing a detailed description of the suspect 110) and cause the call application 224 to be implemented so that the mobile device 121 is controlled to "ring" and the like to provide a notification of the emergency call 107 such that the first responder 122 may "answer" the emergency call 107, and operate the mobile device 121 to participate in the emergency call 107.

In some of these examples, after causing the user of the mobile device 121 to be included on the emergency call 107, the virtual assistant application 123 may communicate on the emergency call 107 (e.g. by again using a text-to-speech application), using the speaker 126, a responding action to be taken by the user of the mobile device 121 when responding to the emergency call 107. For example, the virtual assistant application 123 may use the speaker 126 to instruct the first responder 122 to proceed to pursue the suspect 110 and/or provide a description of the suspect 110 such that the first responder 122 may search for the suspect 110.

In yet further examples, a modification of the action associated with the emergency call 107 at the block 316 may comprise: inviting, using the virtual assistant application 123 and the communication unit 202, a second virtual assistant application operated by a second mobile device, to join the emergency call 107 based on the correlation between the context information with the sensor data, the second mobile device associated with a second user determined to be correlated with the emergency call. For example, the virtual assistant application 123 may communicate with the virtual assistant application 133 at the mobile device 131 (e.g. using the communication unit 202) to invite the virtual assistant application 133 to join the emergency call 107 (e.g. using a group calling command and/or a conference call command, and the like), as the user/first responder 132 of the mobile device 131 is a firefighter, and the incident associated with the emergency call 107 is a fire; hence the role of a firefighter of the first responder 132 is determined to be correlated with the emergency call 107, and the virtual assistant application 133 at the mobile device 131 is invited to join the emergency call 107. Indeed, the method 300 may then be implemented at the mobile device 131.

Figure 4:
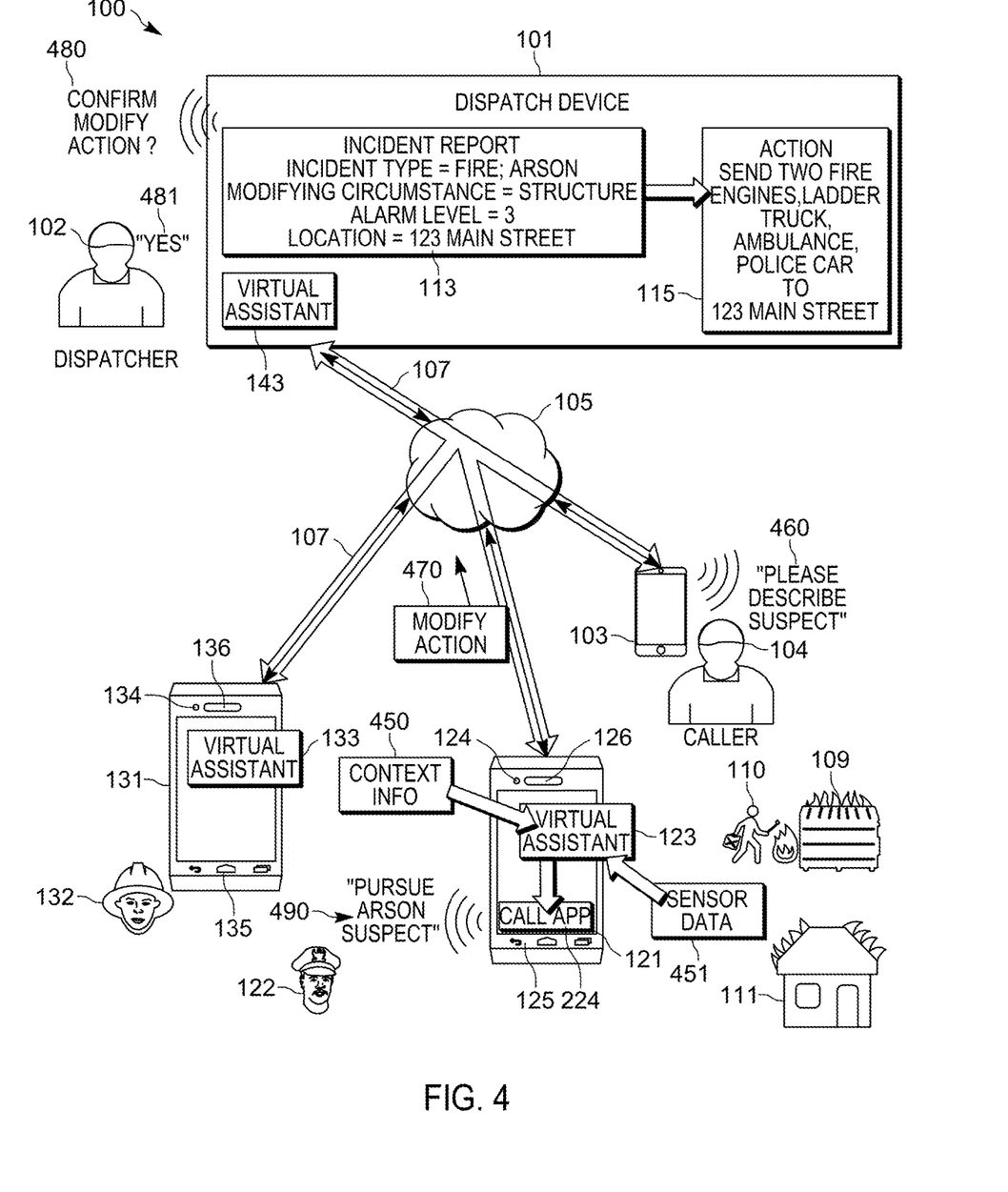
FIG. 4 depicts a method for modifying actions associated with an emergency call being implemented in the system of FIG. 1, in accordance with some examples Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Attention is next directed to FIG. 4 which depicts an example of the method 300. FIG. 4 is substantially similar to FIG. 1 with like components having like numbers.

In particular, in FIG. 4, the virtual assistant application 123 is depicted as receiving context information 450 (which may include, but is not limited to, the context information 150) and sensor data 451. The context information 450 may include information that the first responder 122 is available to respond to the incident associated with the emergency call 107, an indication that the incident comprises a dumpster fire (e.g. but not a building fire), and that the caller 104 has indicated seeing the suspect 110 who may be responsible for the dumpster fire. The sensor data 451 may include, for example, an image of the burning dumpster 109 and the burning building 111, as well as any audio, or other sensor data (e.g. gas sensor data) indicative of the incident associated with the emergency call 107. As depicted, the virtual assistant application 123 asks the caller 104 on the emergency call 107 to describe the suspect (e.g. the virtual assistant application 123 transmits speech 460 "Please Describe Suspect" on the emergency call 107). Any description provided verbally (and/or via images transmitted by the caller 104 using the calling device 103) may be received at the virtual assistant application 123 as the context information 450.

The virtual assistant application 123 determines from a correlation between the context information 450 and the sensor data 451 that the incident report 113 and/or the action 115 are to be modified, for example as the incident report 113 in FIG. 1 may not indicate a building fire and/or arson, and the action 115 may not be suitable for a building fire and/or arson.

Hence, the virtual assistant application 123 transmits a command 470 to modify the incident report 113 and/or the action 115. In some examples, as depicted, the virtual assistant application 123 may request 480 confirmation for modifying the incident report 113 and/or the action 115 from the dispatcher 102 (e.g. the request 480 comprises speech "Confirm Modify Action" provided at a speaker of the dispatch device 101 on the emergency call 107, and may further include a description of the modification and/or, the request 480 may be provided at a display screen of the dispatch device 101). As depicted, the dispatcher 102 provides a response 481 (e.g. speech "YES" on the emergency call 107) to the request 480 to confirm the modification. In some examples, the command 470 may not be transmitted until the response 481 is received and confirms the request 480. When the response 481, however, is negative (e.g. "NO") the command 470 may not be transmitted.

The command 470 is received at the dispatch device 101, the incident report 113 and/or the action 115 are modified accordingly. For example, as depicted, the incident report 113 is modified to change the incident type to include "ARSON", the modifying circumstance is changed from "DUMPSTER" to "STRUCTURE" and the alarm level (e.g. the priority) is increased from "5" to "3". The action 115 is modified accordingly (e.g. in response to the incident report 113 being modified and/or upon receipt of the command 470) to include dispatching of two fire engines, a ladder truck, an ambulance and a police car to the incident associated with the emergency call 107. Hence, in general, the command 470 includes data indicating that incident type and the modifying circumstance at the incident report 113 be changed. The alarm level at the incident report 113 and the action 115 may be changed in response to the change in the incident type and the modifying circumstance, for example using preconfigured rules at the dispatch device 101 and/or via the virtual assistant application 143 at the device 101.

Also depicted in FIG. 4, the virtual assistant application 123 may control the speaker 126 of the mobile device 121 to provide the first responder 122 with a responding action 490 (e.g. speech "Pursue Arson Suspect" and which may be provided with the description received from the caller 104). In addition, the virtual assistant application 123 may cause the call application 224 to be implemented automatically to connect the first responder 122 with the call using the speaker 126 and the microphone 125. The responding action 490 may be provided once the call application 224 is implemented, or independent of the call application 224 being implemented (e.g. the responding action 490 may be provided by the speaker 126 operated in a loudspeaker mode as an alert that the first responder 122 should urgently pursue the suspect 110).

As also depicted in FIG. 4, the modify action command 470 may cause the emergency call 107 to connect with the virtual assistant application 133 of the mobile device 131, which may cause the virtual assistant application 133 to implement the method 300. Indeed, the virtual assistant applications 123, 133 could further exchange sensor data therebetween to further modify actions associated with the emergency call 107. For example, sensors at the mobile devices 121, 131 may collect images of the fires at the dumpster 109 and the building 111 from different angles which may enable the virtual assistant applications 123, 133 to make better decisions about how to modify actions associated with the emergency call 107; indeed, in some examples, the virtual assistant applications 123, 133 may communicate and decide how to modify actions associated with the emergency call 107 in a distributed manner.

Hence, provided herein is a device, system and method for modifying actions associated with an emergency call which may first responders be me more accurately dispatched to an incident. For example mobile devices collect sensor data near the incident which is correlated with context information of the incident analyzed by virtual assistant applications at the mobile devices, which are connected to an emergency call in which the incident is reported. The virtual assistant applications modify an action associated with the incident to more accurately reflect the incident, for example by dispatching more and/or different first responders to the incident then would be dispatched by a dispatcher.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method comprising:
operating, using a controller of a mobile device, a virtual assistant application;
connecting, using the controller and a communication unit of the mobile device, the virtual assistant application to an emergency call that includes a dispatcher and a caller communicating on the emergency call;
monitoring, using the virtual assistant application, the emergency call to determine context information of the emergency call;
receiving, at the virtual assistant application, sensor data from sensors associated with the mobile device;
correlating, using the virtual assistant application, the context information with the sensor data, the correlating including determining that a portion of the context information does not match a respective portion of the sensor data; and
in response to determining that the portion of the context information does not match that respective portion of the sensor data; causing, using the virtual assistant application, a modification of an action associated with the emergency call based on a correlation between the context information with the sensor data, the modification of the action based on the respective portion of the sensor data which does not match the portion of the context information, the action, prior to the modification, initially based on the context information only.

2. The method of claim 1, wherein the modification of the action associated with the emergency call comprises causing a change to one or more of:
a number of emergency responders dispatched in association with the emergency call;
a type of the emergency responders dispatched in association with the emergency call;
an incident report file associated with the emergency call;
an incident type associated with the emergency call;
a modifying circumstance associated with the incident type; and
a priority associated with the emergency call.

3. The method of claim 1, wherein the modification of the action associated with the emergency call comprises:
causing, using a speaker and microphone of the mobile device, a user of the mobile device to be included on the emergency call.

4. The method of claim 3, further comprising:
after causing the user of the mobile device to be included on the emergency call, communicating on the emergency call, by the virtual assistant application, using the speaker, a responding action to be taken by the user of the mobile device when responding to the emergency call.

5. The method of claim 1, further comprising:
requesting, using the virtual assistant application, on the emergency call, that the dispatcher confirm the modification of the action prior to causing the modification of the action.

6. The method of claim 1, further comprising:
inviting, using the virtual assistant application and the communication unit, a second virtual assistant application operated by a second mobile device, to join the emergency call based on the correlation between the context information with the sensor data, the second mobile device associated with a second user determined to be correlated with the emergency call.

7. The method of claim 1, further comprising:
terminating, using the virtual assistant application, a connection to the emergency call by the virtual assistant application when no correlation is determined between the context information of the emergency call and user context information associated with a user of the mobile device.

8. The method of claim 1, wherein the correlating, using the virtual assistant application, the context information with the sensor data comprises: matching information in the sensor data with respective keywords spoken on the emergency call.

9. The method of claim 1, further comprising, the virtual assistant application asking a question on the emergency call based on analysis of the context information, and prior to causing the modification of the action.

10. The method of claim 1, wherein the context information of the emergency call comprises one or more of:
a location associated with the emergency call;
an incident report file associated with the emergency call;
an incident type associated with the emergency call;
a modifying circumstance associated with the incident type;
a priority associated with the emergency call;
user context information of a user associated with the mobile device;
role of the user associated with the mobile device;
capabilities of the user associated with the mobile device;
equipment available to the user associated with the mobile device; and
a current assignment of the user associated with the mobile device.

11. The method of claim 1, wherein the sensor data comprises one or more of:
one or more images from one or more cameras;
audio from one or more microphones;
motion sensor data from one or more motion sensors;
gas sensor data from one or more gas sensors; and
holster sensor data from a holster sensor.

12. A mobile device comprising:
a communication unit; and
a controller communicatively coupled to the communication unit, the controller configured to:
operate a virtual assistant application;
connect, using the communication unit, the virtual assistant application to an emergency call that includes a dispatcher and a caller communicating on the emergency call;
monitor, using the virtual assistant application, the emergency call to determine context information of the emergency call;
receive, at the virtual assistant application, sensor data from sensors associated with the mobile device;
correlate, using the virtual assistant application, the context information with the sensor data, correlating of the context information with the sensor data including determining that a portion of the context information does not match a respective portion of the sensor data; and
in response to determining that the portion of the context information does not match that respective portion of the sensor data; causing, using the virtual assistant application, a modification of an action associated with the emergency call based on a correlation between the context information with the sensor data, the modification of the action based on the respective portion of the sensor data which does not match the portion of the context information, the action, prior to the modification, initially based on the context information only.

13. The mobile device of claim 12, wherein the modification of the action associated with the emergency call comprises causing a change to one or more of:
a number of emergency responders dispatched in association with the emergency call;
a type of the emergency responders dispatched in association with the emergency call;
an incident report file associated with the emergency call;
an incident type associated with the emergency call;
a modifying circumstance associated with the incident type; and
a priority associated with the emergency call.

14. The mobile device of claim 12, wherein the modification of the action associated with the emergency call comprises:
causing, using a speaker and microphone of the mobile device, a user of the mobile device to be included on the emergency call.

15. The mobile device of claim 14, wherein the controller is further configured to:
after causing the user of the mobile device to be included on the emergency call, communicate on the emergency call, by the virtual assistant application, using the speaker, a responding action to be taken by the user of the mobile device when responding to the emergency call.

16. The mobile device of claim 12, wherein the controller is further configured to:
request, using the virtual assistant application, on the emergency call, that the dispatcher confirm the modification of the action prior to causing the modification of the action.

17. The mobile device of claim 12, wherein the controller is further configured to:
invite, using the virtual assistant application and the communication unit, a second virtual assistant application operated by a second mobile device, to join the emergency call based on the correlation between the context information with the sensor data, the second mobile device associated with a second user determined to be correlated with the emergency call.

18. The mobile device of claim 12, wherein the controller is further configured to:
terminate, using the virtual assistant application, a connection to the emergency call by the virtual assistant application when no correlation is determined between the context information of the emergency call and user context information associated with a user of the mobile device.

19. The mobile device of claim 12, wherein the controller is further configured to correlate, using the virtual assistant application, the context information with the sensor data by: matching information in the sensor data with respective keywords spoken on the emergency call.

20. The mobile device of claim 12, wherein the controller is further configured to ask, using the virtual assistant application, a question on the emergency call based on analysis of the context information, and prior to causing the modification of the action.

\* \* \* \* \*